(12) United States Patent
Sohn et al.

(10) Patent No.: US 8,553,957 B2
(45) Date of Patent: Oct. 8, 2013

(54) METHOD OF PROCESSING IMAGE AND IMAGE PROCESSING APPARATUS USING THE METHOD

(75) Inventors: Ki-won Sohn, Seoul (KR); Hae-kyung Jung, Seoul (KR); Young-yoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/334,697

(22) Filed: Dec. 22, 2011

(65) Prior Publication Data

US 2012/0163682 A1    Jun. 28, 2012

Related U.S. Application Data

(60) Provisional application No. 61/425,987, filed on Dec. 22, 2010.

(30) Foreign Application Priority Data

May 27, 2011    (KR) ........................ 10-2011-0050846

(51) Int. Cl.
*G06K 9/00* (2006.01)
(52) U.S. Cl.
USPC ........................................ 382/128

(58) Field of Classification Search
USPC .......................................................... 382/128
See application file for complete search history.

(56) References Cited

U.S. PATENT DOCUMENTS

| | | | |
|---|---|---|---|
| 6,463,167 B1 * | 10/2002 | Feldman et al. | ............... 382/128 |
| 6,724,925 B2 | 4/2004 | Armato, III et al. | |
| 7,221,786 B2 | 5/2007 | Luo et al. | |
| 7,221,787 B2 | 5/2007 | Luo et al. | |

OTHER PUBLICATIONS (Kauezor, Hans-Ulrich, "Contrast-enhanced MRI of the lung", 2000, Elsevier-European Journal of Radiology).*

* cited by examiner

*Primary Examiner* — Samir Ahmed
*Assistant Examiner* — Totam Le
(74) *Attorney, Agent, or Firm* — Sughrue Mion, PLLC

(57) ABSTRACT

A method of processing an image so as to correctly and better extract an image of a lung region, the method including operations of extracting a trachea region_image by using pixel values in a predetermined region of a radiographic image, adjusting pixel values corresponding to the trachea region in the radiographic image, extracting the lung region image from the radiographic image in which the pixel values of the trachea region image have been adjusted, and smoothing outer boundaries of the lung region image.

23 Claims, 8 Drawing Sheets

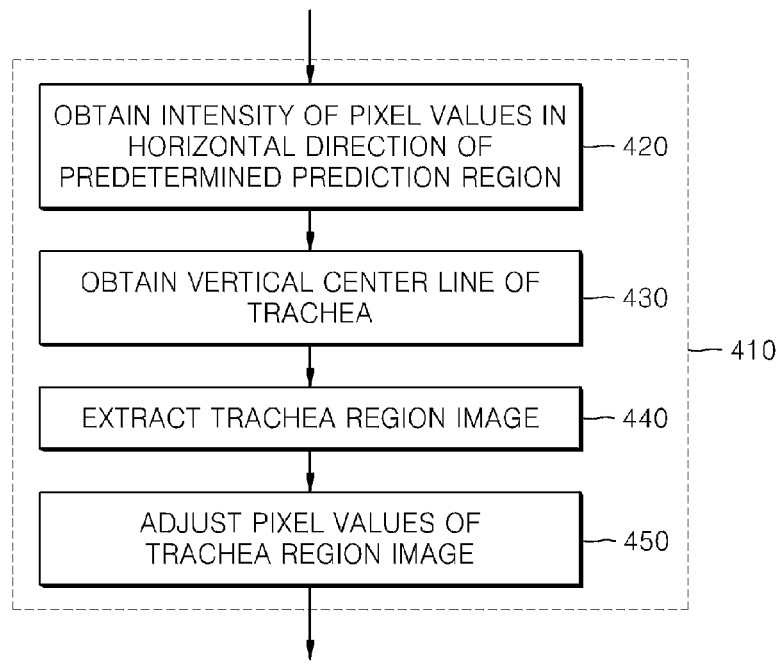
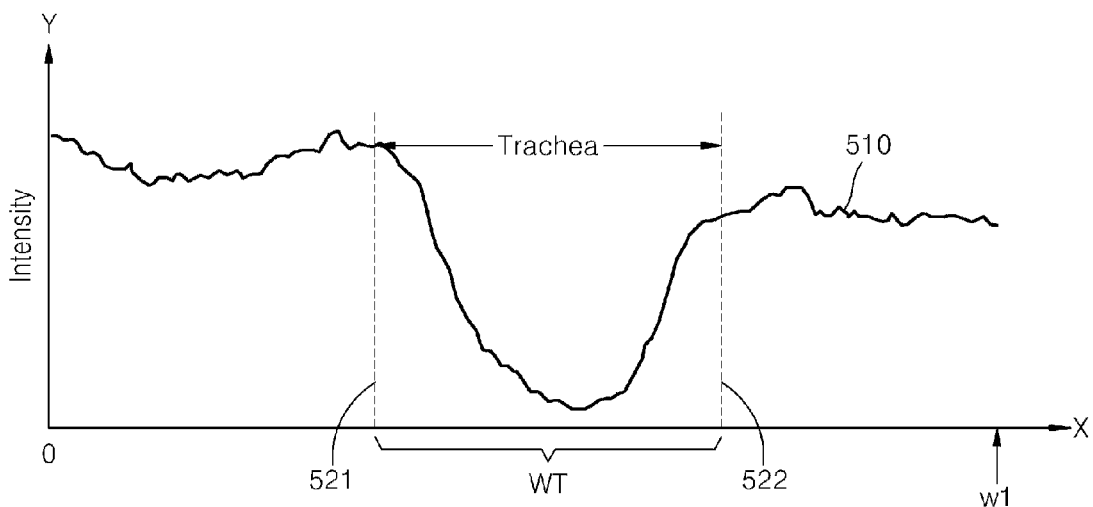

FIG. 6A
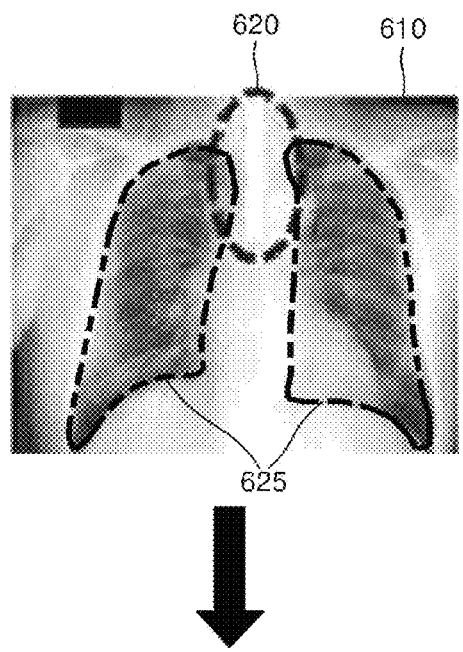
FIG. 6B
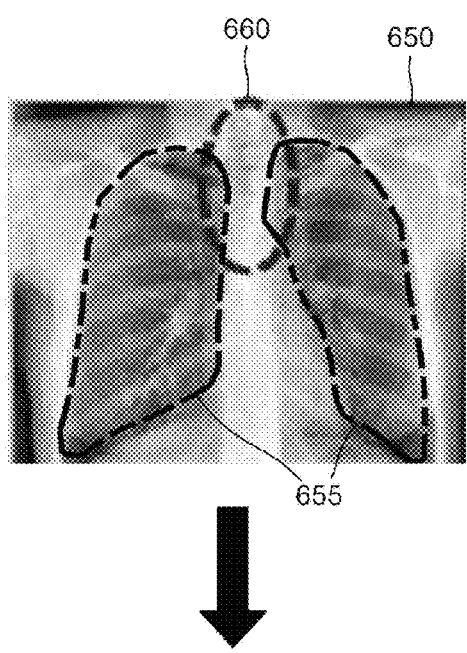
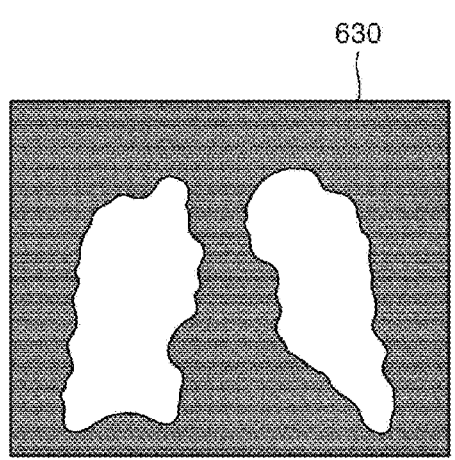
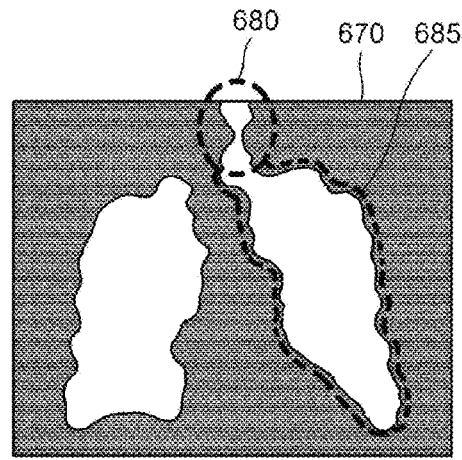

METHOD OF PROCESSING IMAGE AND IMAGE PROCESSING APPARATUS USING THE METHOD

CROSS-REFERENCE TO RELATED PATENT APPLICATION

This application claims the benefit of U.S. Provisional Patent Application No. 61/425,987, filed on Dec. 22, 2010, in the U.S. Patent and Trademark Office, and the benefit of Korean Patent Application No. 10-2011-0050846, filed on May 27, 2011, in the Korean Intellectual Property Office, the disclosures of which are incorporated herein their entireties by reference.

BACKGROUND

1. Field

The exemplary embodiments relate to a method of processing an image and an image processing apparatus using the method, and more particularly, to a method of processing an image captured by irradiating radiation to a chest, and an image processing apparatus using the method.

2. Description of the Related Art

An apparatus for performing chest radiography is one of a number of medical image taking apparatuses that are widely used in medical equipment fields in order to diagnose diseases in a person.

Medical experts including doctors analyze a chest radiographic image obtained by using the apparatus for performing chest radiography, and then determine if disease is present in the person's chest. In order to help the medical experts easily analyze a radiographic image, methods of processing a chest radiographic image and image processing apparatuses thereof have been developed.

For example, the chest radiographic image may be processed by using a computer-aided detection (CAD) method. In more detail, with respect to a captured chest radiographic image, the CAD method may involve performing feature extraction for extracting an image of a region corresponding to a predetermined organ or may involve outputting images by sorting organs included in the captured image.

As described above, it is beneficial to develop a method of processing an image and an image processing apparatus using the method so as to simplify analysis of a radiographic image by the medical experts.

SUMMARY

The present exemplary embodiments provide a method of processing an image and an image processing apparatus thereof so as to help a medical expert easily analyze a lung region in radiographic image analysis.

In more detail, an exemplary embodiment provides a method of processing an image and an image processing apparatus using the method so as to allow an image of a lung region other than an image of a trachea region to be correctly extracted.

According to an aspect of an exemplary embodiment, there is provided a method of processing an image, the method including operations of receiving an image captured by irradiating radiation to a chest; extracting an image of a trachea region by using pixel values in a predetermined region of the image, and adjusting pixel values corresponding to the trachea region in the image; extracting an image of a lung region from the image in which the pixel values of the trachea region have been adjusted; and smoothing outer boundaries of the lung region_image.

The operation of adjusting the pixel values may include operation of adjusting the pixel values corresponding to the trachea region image so as to allow a luminance or brightness of the trachea region image to be increased.

The operation of adjusting the pixel values may include operation of adjusting the pixel values corresponding to the trachea region image so as to allow a luminance or brightness of the trachea region image to be distinguished from a luminance or brightness of the lung region image.

The operation of adjusting the pixel values may include operations of obtaining an intensity of the pixel values in a horizontal direction of a prediction region in which the trachea region image is predicted to be positioned; obtaining a vertical center line of the trachea region by using the intensity; extracting the trachea region image by using the vertical center line; and adjusting the pixel values corresponding to the trachea region image.

The operation of obtaining the vertical center line may include operation of obtaining the vertical center line by using an arg( ) function and the intensity obtained from at least two horizontal pixel lines in the prediction region.

The operation of adjusting the pixel values may include operation of extracting the trachea region image by using a difference between pixel values in the prediction region in which the trachea region image is predicted to be positioned in the image.

The operation of adjusting the pixel values may include operation of extracting the trachea region image based on a trachea statistical position model or trachea statistical form information.

The operation of extracting the lung region image may include operation of extracting the lung region image by using a geometric active contour model.

The operation of smoothing may include operations of setting one or more outermost points on the outer boundaries of the lung region image as convex hull points, and smoothing the outer boundaries of the lung region image by using the convex hull points.

The operation of smoothing may include operation of modifying the outer boundaries of the lung region image as a convex hull curve by using the convex hull points.

According to another aspect of an exemplary embodiment, there is provided an image input unit for receiving an image captured by irradiating radiation to a chest; and an image improvement processing unit for extracting an image of a trachea region by using pixel values in a predetermined region of the image, for adjusting pixel values corresponding to the trachea region in the image, for extracting a lung region_image from the image in which the pixel values of the trachea region have been adjusted, and for outputting an improved image by smoothing outer boundaries of the lung region image.

In yet another aspect, there is a method of processing an image, the method including: receiving an image captured by irradiating radiation to a chest; extracting an image of a trachea region based on pixel values in a predetermined region of the image, and adjusting pixel values corresponding to the trachea region in the image; generating an image of the trachea region based on the adjusted pixel values; and extracting an image of a lung region from the generated image of the trachea region.

In one aspect, there is an image processing apparatus including: an image input unit which receives an image captured by irradiating radiation to a chest; and an image processing unit which extracts an image of a trachea region based on pixel values in a predetermined region of the image, and adjusts pixel values corresponding to the trachea region in the image, and extracts a lung region image from the adjusted pixel values corresponding to the trachea region.

In another aspect, there is a method of processing an image, the method including: receiving a radiation chest image; setting a predetermined region in the radiation chest image; determining an image of the trachea in the predetermined region, the determining including determining one boundary of the image of the trachea based on one from among i) a rate of change of pixel values along a linear direction with respect to a first threshold value and ii) a change in the rate of change of pixel values along the linear direction with respect to a second threshold value; adjusting pixel values of the image of the trachea to generate an adjusted image of the trachea; and determining an image of the lung based on the image of the trachea, wherein the determining the image of the lung includes applying a geometric active contour model.

BRIEF DESCRIPTION OF THE DRAWINGS

The above and other features and aspects of the exemplary embodiments will become more apparent by describing in detail with reference to the attached drawings in which:

FIG. 4 is a flowchart for describing an operation for extracting the trachea region image;

FIG. 5 is a diagram describing an operation for extracting a trachea region image;

FIGS. 6A and 6B illustrate diagrams describing an operation for extracting a lung region;

DETAILED DESCRIPTION

Hereinafter, the exemplary embodiments will be described in detail with reference to the attached drawings.

Figure 1:
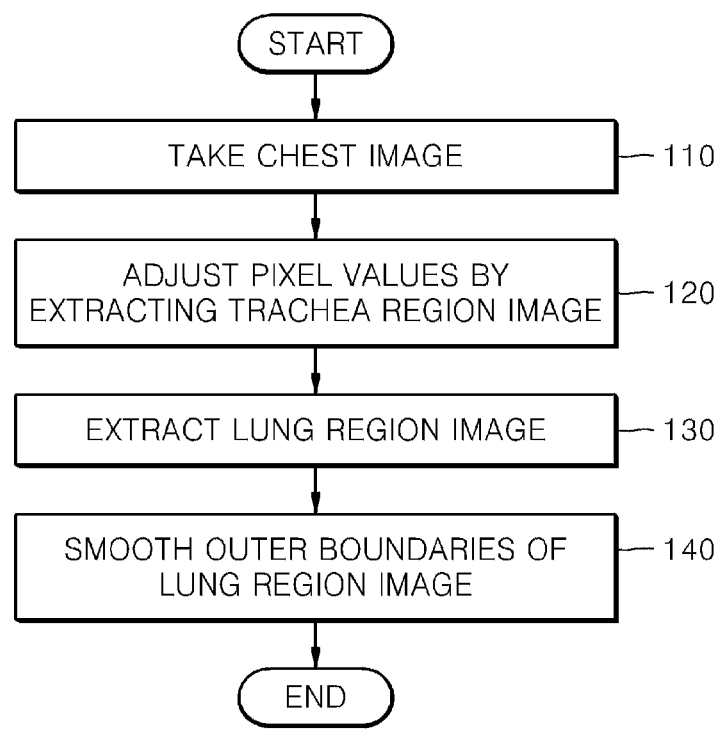
FIG. 1 is a flowchart illustrating a method of processing an image according to an exemplary embodiment.

FIG. 1 is a flowchart illustrating a method of processing an image according to an exemplary embodiment.

Referring to FIG. 1, the method involves receiving an image obtained by irradiating radiation to a part of the party, e.g., to a chest. In other words, a chest image is taken (operation 110). In more detail, through operation 110, a radiographic image captured by a radiograph camera for capturing an image, e.g., a chest image, by irradiating an X-ray to a body part such as a chest, is received.

Figure 2:
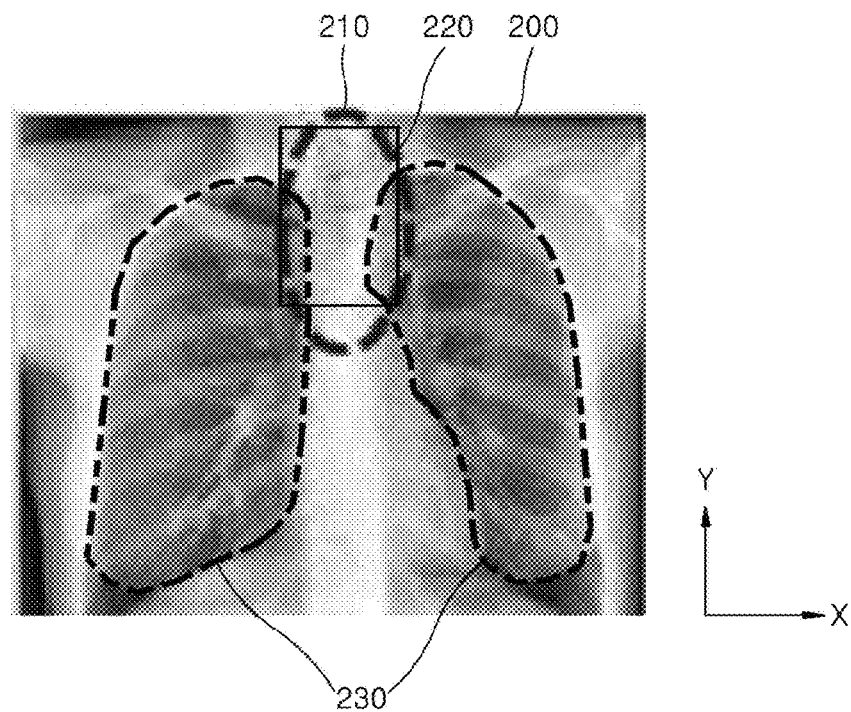
FIG. 2 illustrates a chest radiographic image.

FIG. 2 illustrates an image 200 indicating a chest radiographic image. That is, FIG. 2 illustrates the image 200 which represents the image received in operation 110.

Referring to FIG. 2, the image 200 includes an image of body tissue such as a trachea 210, lungs 230, blood vessels, fibrous tissues or muscles. A representative example of the body tissue to be determined with respect to a disease, i.e., diagnosed, in organs by using the chest radiographic image is a lung. Hereinafter, operations for extracting only an image of a region of the lungs 230 other than the body tissue such as the trachea 210 will now be described in detail with reference to FIGS. 3 through 7.

First, an image of a region of the trachea 210 is extracted by using pixel values in a predetermined region 220 of the image 200 received in operation 110, and pixel values corresponding to the trachea 210 in the image 200 are adjusted (operation 120). Here, the predetermined region 220 may be a window block that is used to extract the image of the region of the trachea 210. An average size of tracheas of adults is 20 mm (width)×120 mm (length). Thus, the window block used to extract the image of the region of the trachea 210 may be set as a size that may include the trachea 210. For example, the window block to extract the region of the trachea 210 may be set as 30 mm (W)×70 mm (H).

A position at which the window block that is the predetermined region 220 is disposed may be a region in which the trachea 210 is predicted to be positioned. That is, the window block may be disposed at an upper region between the lungs 230.

In more detail, the region of the trachea 210 may be extracted by using a difference between pixel values in the predetermined region 220 in which the trachea 210 is predicted to be positioned. Due to a characteristic of the radiographic image, the regions of the trachea 210 and the lungs 230 have smaller pixel values than an average pixel value of the image 200, and appear dim region compared to other body tissue such as bones. Here, the pixel value is a value stored in a pixel of a camera for capturing a radiographic image so as to express an image, and may indicate a value of a luminance level or a brightness level, more particularly, the pixel value may indicate a gray level.

In more detail, due to the characteristic of the radiographic image, the trachea 210 has a lower luminance than its adjacent region. Thus, by analyzing pixel intensity in the predetermined region 220, an image of a region having lower pixel intensity than the adjacent region may be extracted as the region of the trachea 210.

Also, in operation 120, the image of the region of the trachea 210 may be extracted based on statistical position model of trachea or statistical form information of trachea. Here, the statistical position model of trachea or the statistical form information of trachea is statistical information obtained by classifying positions and forms of tracheas by analyzing chest radiographic images of several people. In more detail, the trachea statistical position model or the trachea statistical form information may be information obtained by classifying or storing positions and forms of tracheas according to a gender, an age, and a height of several people who have undergone chest radiography.

For example, when a person who has undergone radiography is a man in his thirties and belongs to a group of people having a height range from 170 cm to 175 cm, the image of the region of the trachea 210 may be extracted by using position and form information regarding the most general trachea in the aforementioned gender, age, and height range. That is, based on the trachea statistical position model or the trachea statistical form information, a form and position of a trachea belonging to a person who has undergone radiography is predicted, and the predicted form of the trachea at the predicted position is extracted as the image of the region of the trachea 210.

Afterward, pixel values of the extracted region image of the trachea 210 are adjusted. In more detail, the pixel values of the extracted region image of the trachea 210 are adjusted to increase a luminance or brightness of the region image of the trachea 210. For example, the pixel values corresponding to the region image of the trachea 210 may be increased to 130% of their original values.

Alternatively, the pixel values of the extracted region image of the trachea 210 are adjusted to distinguish the luminance or brightness of the region image of the trachea 210 from a luminance or brightness of the region of the lungs 230.

For example, if average pixel values of the region image of the lungs 230 in the image 200 have small values, average pixel values of the extracted region image of the trachea 210 may be adjusted to have predetermined level values that are on the average, large. Here, each pixel values of the region image of the trachea 210 may be set as an experimentally optimized value so as to clearly distinguish the luminance or brightness of the region image of the trachea 210 from the luminance or brightness of the region of the lungs 230.

Figure 3:
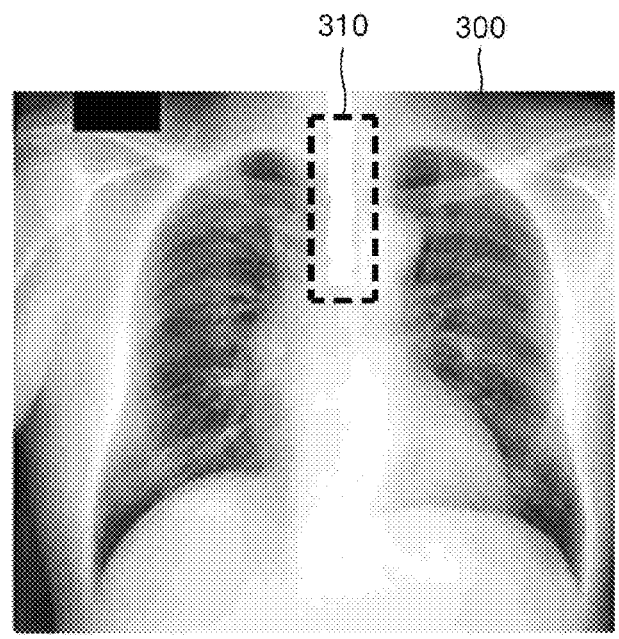
FIG. 3 is a diagram illustrating an image in which pixel values corresponding to an image of a trachea region have been adjusted.

FIG. 3 is a diagram illustrating an image 300 in which pixel values of the region image of the trachea 210 have been adjusted. Referring to FIG. 3, the pixel values of the region image of the trachea 210 have been adjusted so that brightness of the region is increased. That is, an image of a trachea region 310 in which pixel values have been adjusted has larger pixel values than the region image of the trachea 210 in the image 200.

Another example of operation 120 for extracting a trachea will now be described in detail with reference to FIGS. 4 and 5. And, the operation 120 in FIG. 1 corresponds to operation 410 in FIG. 4.

FIG. 4 is a flowchart 410 for describing an operation for extracting the region image of the trachea 210. Operations included in the flowchart 410 of FIG. 4 correspond to an example of operation 120 of FIG. 1 which involves extracting the region image of the trachea 210.

Referring to FIG. 4, intensity of pixels in a horizontal direction of a prediction region 220 in which the trachea 210 is predicted to be positioned is obtained (operation 420). Here, the horizontal direction indicates an X-axis direction in FIG. 2 and is a direction perpendicular or at least substantially perpendicular to an orientation of a spine of a human body. The intensity of the pixels may be the aforementioned pixel values.

In more detail, the prediction region 220 is set as a region of interest window (ROI window), and the intensity of pixels for each pixel line in the horizontal direction of the ROI window is obtained. The intensity of pixels for any one of the pixel lines in the horizontal direction will now be described in detail with reference to FIG. 5.

FIG. 5 is a diagram describing an operation for extracting a trachea region image and illustrates a graph 510 with respect to pixel intensity of pixels for any one of the pixel lines in the horizontal direction of the prediction region 220 of the trachea 210. In the graph 510, an X-axis indicates pixel lines W that are arrayed in the horizontal direction of the prediction region 220, and a Y-axis indicates the pixel intensity.

Due to a general characteristic of a radiographic image, the trachea region image has relatively low pixel intensity, and a value of the pixel intensity is stepwise decreased or increased with respect to a boundary of the trachea 210. Thus, a point at which a decreasing rate of change of pixel intensity is below a predetermined value may be determined as a left boundary 521 of the trachea 210, and a point at which an increasing rate of change of pixel intensity exceeding a predetermined value may be extracted as a right boundary 522 of the trachea 210. Here, the rate of change of the pixel intensity may be obtained according to the change in slope of the graph 510. Hence, the rate of change of the slope would be used to determine the boundaries of the trachea. Also, in an alternative exemplary embodiment, the a simple rate of increase or a simple rate of decrease of pixel intensity, i.e., slope, may be used to determine the boundaries of a trachea, based on experimental or statistical data.

In operation 420, the pixel intensity may be obtained for each pixel line in the horizontal direction of the prediction region 220.

By using the pixel intensity obtained in operation 410, a vertical center line of the region image of the trachea 210 is obtained (operation 430). The vertical center line of the region image of the trachea 210 may be obtained by connecting trachea center points of two or more of the pixel lines in the horizontal direction of the prediction region 220.

Hereinafter, an example of obtaining a trachea center point will now be described. The trachea center point may be obtained by using an arg( ) function and pixel intensity for each pixel line in the horizontal direction. The arg( ) function is a known function to one of ordinary skill in the art and thus detailed descriptions thereof will be omitted here.

$$C = \underset{x_n}{\mathrm{argmax}} \frac{\sum_{x=x_n}^{x_n+w_T} S(x, y_n)}{\frac{\sum_{x=x_n}^{x_n+w_T} S(x, y_n)^2}{N_R} - \frac{\left[\sum_{x=x_n}^{x_n+w_T} S(x, y_n)\right]^2}{N_R^2}} \downarrow, \text{ and} \quad \text{[Equation 1]}$$

$$x_n \in \{x_{n-1} - 1, x_{n-1}, x_{n-1} + 1\},$$

where, C indicates the trachea center point, and $S(x, y_n)$ indicates pixel intensity at a $(x, y_n)$ position. Here, x may be all pixels positioned in a pixel line in the horizontal direction. $W_T$ indicates a width of a trachea which is a length in the horizontal direction, and $N_R$ indicates the number of all pixels positioned in the ROI window that is the prediction region 220. Also, $(x_n, y_n)$ indicates an uppermost left point of the ROI window.

In at least two pixel lines in the horizontal direction, the vertical center line may be obtained by connecting trachea center points obtained by using Equation 1.

The trachea region image is extracted by using the vertical center line obtained in operation 430 (operation 440). In more detail, statistically, a size of the most common trachea is about 20 mm (W)×120 mm (H), thus, a region extending in left and right directions by 10 mm with respect to the vertical center line may be extracted as the trachea region.

Afterward, pixel values of the trachea region image extracted in operation 430 are adjusted (operation 440). For example, the pixel values of the extracted trachea region image may be adjusted, i.e., increased, to be 130% of their original values. The adjustment of the pixel values corresponding to the trachea region image in operation 440 is described above with reference to FIG. 3, and thus detailed descriptions thereof will be omitted here.

Afterward, an image of a lung region is extracted (operation 130). In more detail, boundaries of the lung region image are extracted from the image 300 in which pixel values of the region of the trachea 210 have been adjusted in operation 120.

In more detail, the lung region image is segmented from the image 300 by using a geometric active contour model. The geometric active contour model is an image segmentation model used to extract a specific region in an image processing technology. In more detail, in order to extract a predetermined object included in an image, the geometric active contour model involves obtaining a boundary curve by analyzing pixel values of the image, and involves extracting a region image segmented by the boundary curve.

In the present exemplary embodiment, the geometric active contour model is used as a segmentation algorithm for segmenting a lung region image from a radiographic image. In more detail, in the present exemplary embodiment, a Chan-Vese Active Contour Model may be used to extract the lung region image. Hereinafter, the Chan-Vese Active Contour Model is used as the geometric active contour model.

FIGS. 6A and 6B illustrate diagrams describing an operation for extracting a lung region image. An image 610 illustrated in FIG. 6A correspond to the image 300 in which pixel values of the image of the region of the trachea 210 have been adjusted in FIG. 3.

Referring to FIG. 6A, in the image 610, a pixel value of a trachea region image 620 is adjusted so that a luminance or brightness of the trachea region 620 is increased. Thus, the trachea region image 620 has a larger pixel value, that is, a higher luminance or higher brightness, compared to a lung region image 625.

When a Chan-Vese Active Contour Model is applied to the image 610, an image 630 in which only the lung region image 625 is segmented and extracted is generated. Since the Chan-Vese Active Contour Model is an algorithm used to segment and extract a predetermined object based on pixel values in an image, if the luminance of the trachea region image 620 and the luminance of the lung region image 625 are clearly distinguished from each other as shown in the image 610, only the lung region image 625 is extracted, and the trachea region image 620 having the different luminance from the lung region image 625 is not extracted.

FIG. 6B illustrates a case in which a lung region image 655 is extracted by using an image 650 in which pixel values of a trachea region 660 have not been adjusted. Here, the image 650 corresponds to the image 200 received in operation 110.

In a radiographic image 650, the trachea region 660 generally has pixel values that are similar to the pixel values of the lung region image 655. Thus, in a case where the geometric active contour model is applied to the image 650 so as to segment and extract a predetermined object by using the pixel values, images of a trachea and a lung are extracted together since the trachea and the lung images are objects having similar pixel values, that is, similar luminance or similar brightness.

Thus, a lung region image 685 that is an extraction target object, and a trachea region image 680 are extracted together. That is, an image 670 includes both the trachea region image 680 and the lung region image 685. In this case, it is not possible to define an upper boundary of a lung image due to an image of a trachea that is extracted along with the lung, while being adjacent to the lung.

That is, as described with reference to FIG. 6B, if a general lung region extraction method is used, a lung region image including a trachea region image is extracted. Thus, it is not possible to correctly extract only the lung region image. In this regard, according to the present exemplary embodiment, pixel values of a trachea region image are adjusted and then a lung region image is segmented and extracted in an input radiographic image, so that the lung region image may be correctly extracted. Thus, analysis of an image of the lung region by a medical expert may be more simplified.

Further, the method of processing an image according to an exemplary embodiment described in FIG. 1 further comprises operation 140. After the operation 130, an outer boundary of the lung region image extracted in operation 130 is smoothed (operation 140). The smoothing operation of operation 140 will now be described in detail with reference to FIGS. 7 through 9.

Figure 7:
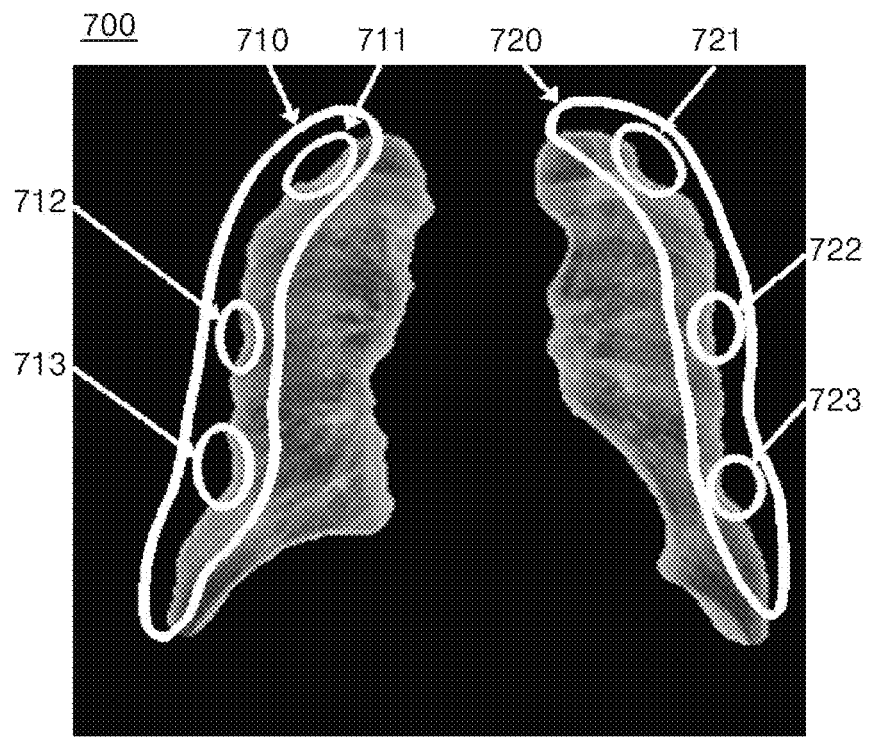
FIG. 7 illustrates an image of an extracted lung region image.

FIG. 7 illustrates an image 700 of an extracted lung region.

Referring to FIG. 7, the image 700 including the lung region image extracted in operation 130 is shown. The image 700 only includes the lung region image. In a case where the lung region image is extracted by applying a Chan-Vese Active Contour Model to a radiographic image, a plurality of grooves 711, 712, 713, 721, 722, and 723 are included in the lung region image. Due to a characteristic of the radiographic image, the grooves 711, 712, 713, 721, 722, and 723 occur when rib parts are also captured in the radiographic image.

The grooves 711, 712, 713, 721, 722, and 723 may prevent a medical expert from analyzing outer boundaries 710 and 720 of the lung region image. Thus, according to the present exemplary embodiment, the outer boundaries 710 and 720 of the lung region image are smoothed so as to compensate for the shape of the grooves 711, 712, 713, 721, 722, and 723.

Figure 8:
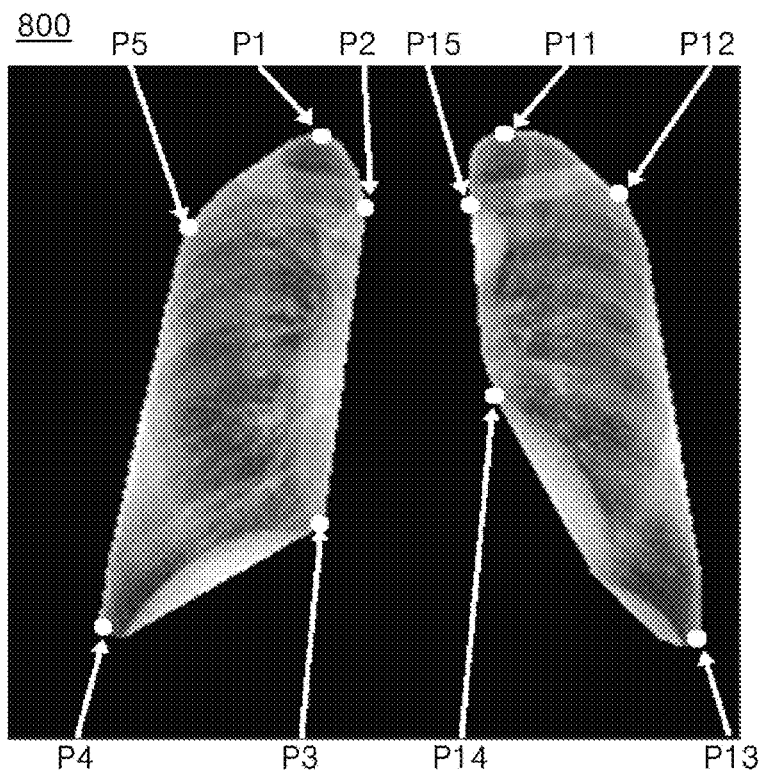
FIG. 8 illustrates an image for describing an operation for smoothing outer boundaries of a lung region image.

FIG. 8 illustrates an image for describing an operation for smoothing outer boundaries of a lung region image.

In more detail, one or more of outermost points P1, P5, P4, P11, P12, and P13 on the outer boundaries 710 and 720 of the lung region image extracted in operation 130 may be set as convex hull points, and the outer boundaries 710 and 720 of the lung region image may be smoothed by using the convex hull points (operation 140). Here, the smoothing is achieved by removing the grooves 711, 712, 713, 721, 722, and 723 and by connecting the convex hull points into a curved line.

In more detail, operation 140 may further include an operation of modifying the outer boundaries 710 and 720 of the lung region image, which are extracted in operation 130, as a convex hull curve generated by connecting the convex hull points.

In the image of FIG. 8, not only the outer boundaries 710 and 720 of the lung region image but also inner boundaries of the lung region image are smoothed by using one or more outermost points P2, P3, P14, and P15.

Figure 9:
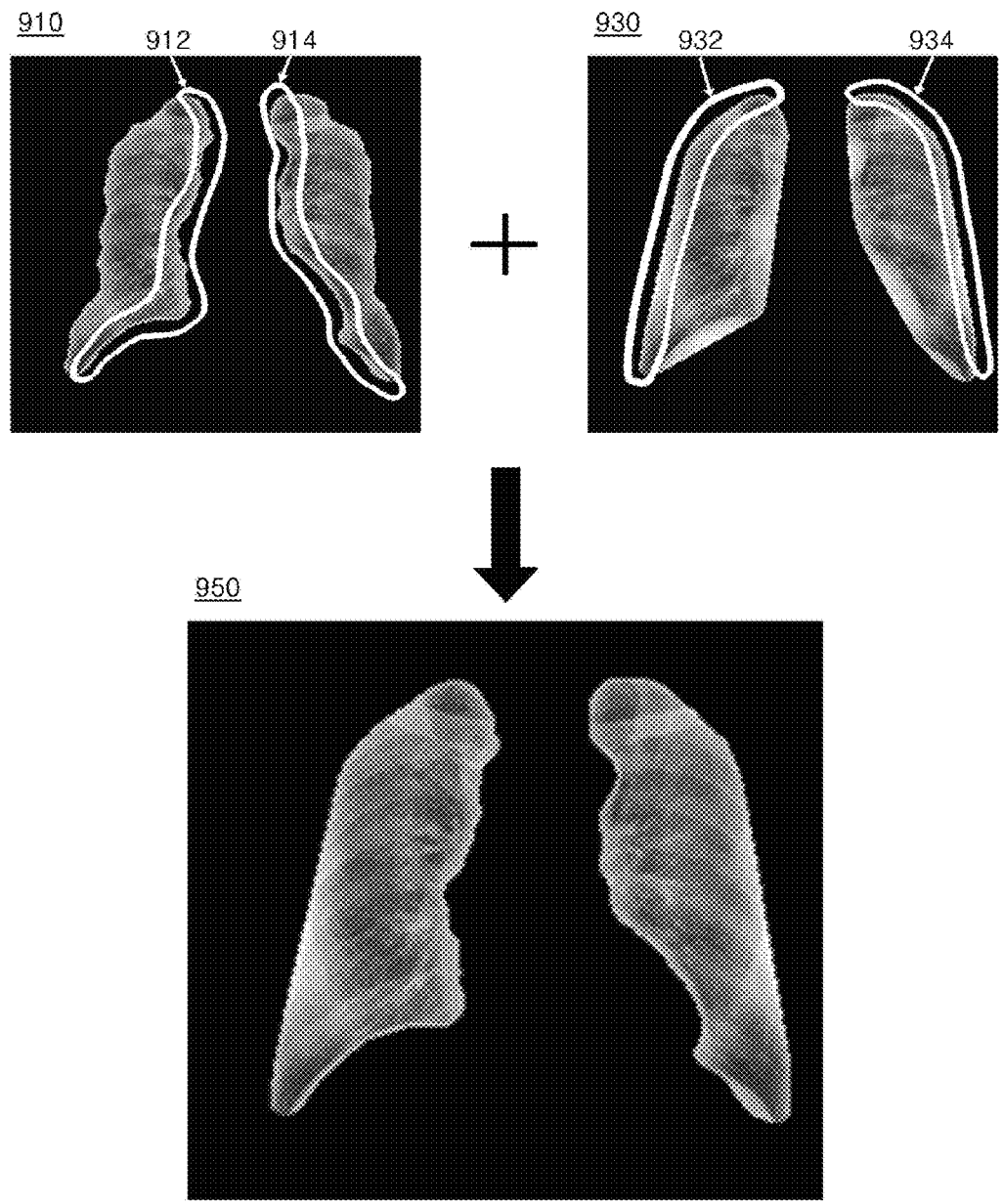
FIG. 9 illustrates other images for describing an operation for smoothing outer boundaries of a lung region image.

FIG. 9 illustrates other images for describing an operation for smoothing outer boundaries of a lung region image. In FIG. 9, an image 910 corresponds to the image 700 of FIG. 7 which includes the lung region image extracted in operation 130, and an image 930 corresponds to an image 800 described with reference to FIG. 8.

Referring to FIG. 9, with respect to the lung region image extracted in operation 130, inner boundaries 912 and 914 are maintained and outer boundaries 932 and 934 are smoothed by using a convex hull curve, so that a final image 950 is generated.

As described above, the present exemplary embodiment performs the smoothing operation in operation 140, thereby compensating for all grooves at the outer boundaries of the lung region image which occur when the lung region image is extracted. By doing so, the lung region image may be better extracted. Thus, medical experts may more easily analyze whether there is a disease in the lung region.

Figure 10:
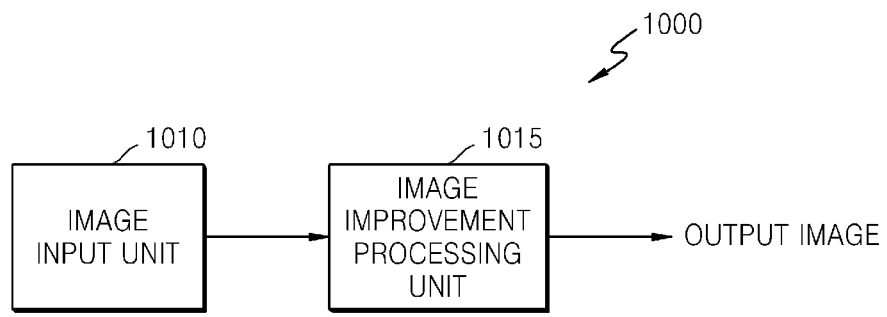
FIG. 10 is a block diagram illustrating an image processing apparatus, according to an exemplary embodiment.

FIG. 10 is a block diagram illustrating an image processing apparatus 1000, according to an exemplary embodiment.

Referring to FIG. 10, the image processing apparatus 1000 includes an image input unit 1010 and an image improvement processing unit 1015.

The image input unit 1010 receives an image captured by irradiating radiation to a chest. In more detail, the image is the same as the image 200 described above with reference to FIG. 2, and the image input unit 1010 performs operation 110 described above with reference to FIG. 1.

The image improvement processing unit 1015 extracts a trachea region image by using pixel values in a predetermined region of the image 200, and adjusts pixel values of the trachea region image extracted from the image 200. Afterward, the image improvement processing unit 1015 extracts a lung region image from an image in which the pixel values of the trachea region have been adjusted. Further, the image improvement processing unit 1015 can output an improved image by smoothing outer boundaries of the extracted lung region image. In more detail, the image improvement processing unit 1015 performs operations 120, 130, and 140 described above with reference to FIG. 1.

A detailed configuration of the image processing apparatus 1000 will now be described in detail with reference to FIGS. 11 and 12.

Figure 11:
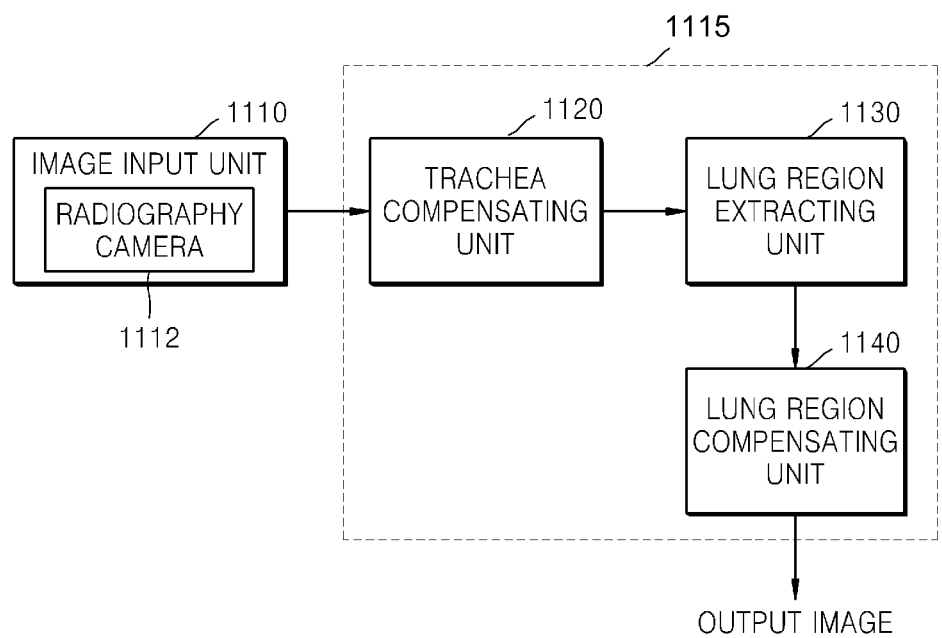
FIG. 11 is a block diagram illustrating an image processing apparatus, according to another exemplary embodiment.

FIG. 11 is a block diagram illustrating an image processing apparatus 1100, according to another exemplary embodiment. The image processing apparatus 1100, an image input unit 1110, and an image improvement processing unit 1115 of FIG. 11 correspond to the image processing apparatus 1000, the image input unit 1010, and the image improvement processing unit 1015 of FIG. 10, respectively. Thus, detailed descriptions, which are the same as the image processing apparatus 1000 of FIG. 10, will be omitted here.

The image input unit 1110 may further include a radiography camera 1112. The radiography camera 1112 captures a radiographic image by irradiating radiation to a human body. In more detail, the radiography camera 1112 may capture a chest radiographic image by irradiating radiation to a human chest.

The image improvement processing unit 1115 may include a trachea compensating unit 1120, a lung region extracting unit 1130, and a lung region compensating unit 1140.

The trachea compensating unit 1120 extracts a trachea region image by using pixel values in a predetermined region of an image transmitted from the image input unit 1110. Also, with respect to the image, the trachea compensating unit 1120 adjusts pixel values corresponding to the extracted trachea region image. In more detail, the trachea compensating unit 1120 performs operation 120 described above with reference to FIG. 1.

The lung region extracting unit 1130 extracts a lung region image from an image in which the pixel values of the trachea region image have been adjusted. In more detail, the lung region extracting unit 1130 performs operation 130 described above with reference to FIG. 1.

The lung region compensating unit 1140 smoothes outer boundaries of the lung region image extracted by the lung region extracting unit 1130. In more detail, the lung region compensating unit 1140 performs operation 140 described above with reference to FIG. 1.

Figure 12:
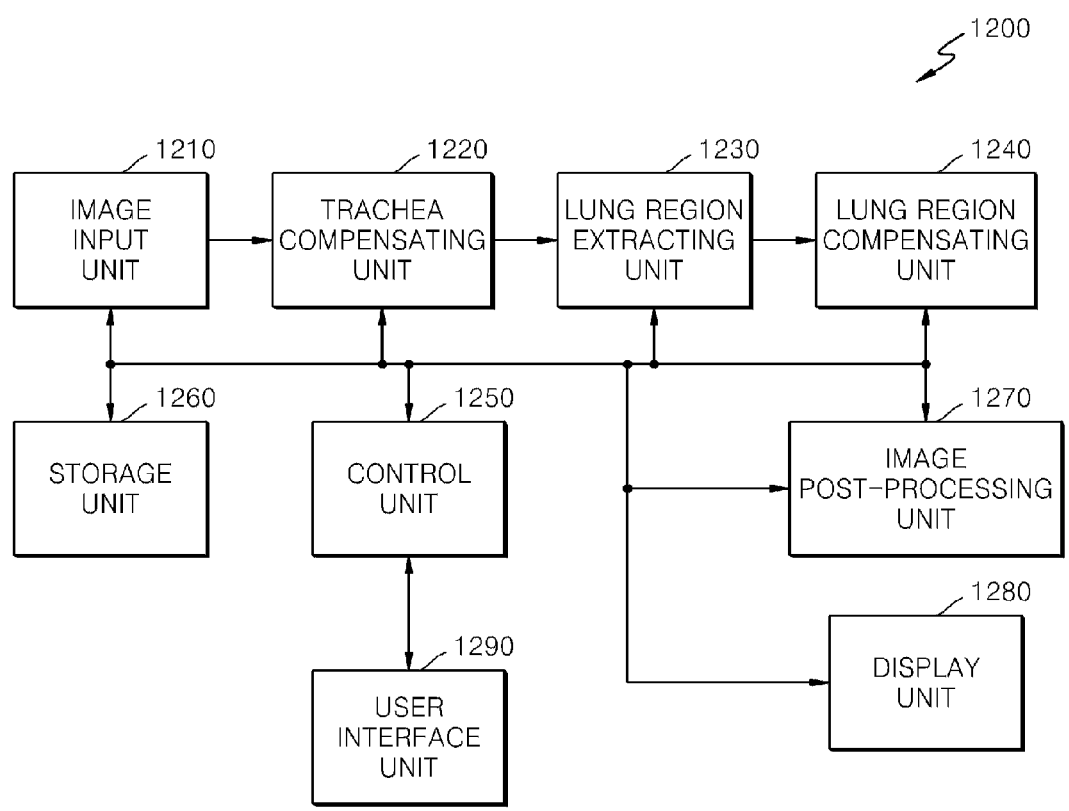
FIG. 12 is a block diagram illustrating an image processing apparatus, according to another exemplary embodiment.

FIG. 12 is a block diagram illustrating an image processing apparatus 1200, according to another exemplary embodiment. An image input unit 1210, a trachea compensating unit 1220, a lung region extracting unit 1230, and a lung region compensating unit 1240 of FIG. 12 correspond to the image input unit 1110, the trachea compensating unit 1120, the lung region extracting unit 1130, and the lung region compensating unit 1140 of FIG. 11, respectively, and thus, their detailed descriptions thereof will be omitted here.

Compared to the image processing apparatuses 1000 and 1100, the image processing apparatus 1200 may further include a control unit 1250, a storage unit 1260, an image post-processing unit 1270, a display unit 1280, a user interface unit 1290, and the like.

The control unit 1250 controls operations of the image processing apparatus 1200. For example, the control unit 1250 controls predetermined data to be stored in the storage unit 1260 and controls the trachea compensating unit 1220, the lung region extracting unit 1230, and the lung region compensating unit 1240 to perform the aforementioned operations.

The storage unit 1260 may store a program for processing and controlling the control unit 1250. Also, the storage unit 1260 stores an image to be input to the image input unit 1210. In addition, the storage unit 1260 may store an image in which pixel values of a trachea have been adjusted, which is generated by the trachea compensating unit 1220, and may store an extracted lung region image, which is generated by the lung region extracting unit 1230. Also, the storage unit 1260 may store an image generated by the lung region compensating unit 1240.

The image post-processing unit 1270 may perform an image processing operation including noise removal, luminance compensation, error correction, and other image processing operations on the image that is output from the lung region compensating unit 1240. Due to the image processing operation being performed by the image post-processing unit 1270, noise of the entire image is removed, so that image quality of a radiographic image may be further improved.

The display unit 1280 displays at least one of an image output from the image input unit 1210, an image output from the lung region compensating unit 1240, and an image output from the image post-processing unit 1270. Also, the display unit 1280 may display user interface data.

The user interface unit 1290 receives a predetermined request or data from a user, or outputs user interface data so as to inform the user of predetermined data. In more detail, the user interface unit 1290 may output user interface data so as to determine whether to smooth inner boundaries of a lung region image, in addition to an operation for smoothing outer boundaries of the lung region image. Accordingly, the user interface unit 1290 may receive at least one of a request to smooth only the outer boundaries and a request to smooth both the outer boundaries and the inner boundaries.

The user interface unit 1290 transmits the user request to the control unit 1250, and the control unit 1250 performs a control operation according to the user request.

Detailed operations of the image processing apparatuses 1000, 1100, and 1200 described with reference to FIGS. 10 through 12 are substantially the same as operations performed in the method of processing an image according to the previous exemplary embodiment. Thus, with respect to the image processing apparatuses 1000, 1100, and 1200 illustrated in FIGS. 10 through 12, detailed descriptions that are the same as the method described above with reference to FIGS. 1 through 9 are omitted here.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of processing an image, the method comprising:
 receiving an image captured by irradiating radiation to a chest;
 extracting an image of a trachea region based on pixel values in a predetermined region of the image, and adjusting pixel values corresponding to the trachea region in the image;
 generating an image of the trachea region based on the adjusted pixel values; and
 extracting an image of a lung region from the generated image of the trachea region.

2. The method of claim 1, wherein the adjusting of the pixel values comprises increasing a luminance or a brightness of the pixel values corresponding to the image of the trachea region.

3. The method of claim 1, wherein the adjusting of the pixel values comprises distinguishing a luminance or a brightness of the pixel values corresponding to the image of the trachea region from a luminance or a brightness of the image of the lung region.

4. The method of claim 1, wherein the adjusting of the pixel values comprises:
 setting a prediction region in which the image of the trachea region is predicted to be disposed;
 obtaining intensities of pixel values in a horizontal direction of a prediction region;
 obtaining a vertical center line of the trachea by using the intensities of the pixel values;
 extracting the image of the trachea region based on the vertical center line; and
 adjusting the pixel values corresponding to the image of the trachea region.

5. The method of claim 4, wherein the obtaining of the vertical center line comprises obtaining the vertical center line by using an arg( ) function and intensity values obtained from at least two horizontal pixel lines in the prediction region.

6. The method of claim 1, wherein the adjusting of the pixel values comprises extracting the image of the trachea region by using a difference between pixel values in prediction region in which the image of the trachea region is predicted to be positioned in the image.

7. The method of claim 1, wherein the adjusting of the pixel values comprises extracting the image of the trachea region based on a statistical position model of the trachea or a statistical form information of the trachea.

8. The method of claim 1, wherein the extracting of the image of the lung region comprises extracting the image of the lung region by using a geometric active contour model.

9. The method of claim 1, further comprising;
 smoothing outer boundaries of the image of the lung region.

10. The method of claim 9, wherein the smoothing comprises setting one or more outermost points on the outer boundaries of the image of the lung region image as convex hull points, and smoothing the outer boundaries of the image of the lung region by using the convex hull points.

11. The method of claim 10, wherein the smoothing comprises modifying the outer boundaries of the image of the lung region as a convex hull curve by using the convex hull points.

12. An image processing apparatus comprising:
 an image input unit which receives an image captured by irradiating radiation to a chest; and
 an image processing unit which extracts an image of a trachea region based on pixel values in a predetermined region of the image, and adjusts pixel values corresponding to the trachea region in the image, and extracts a lung region image from the adjusted pixel values corresponding to the trachea region.

13. The image processing apparatus of claim 12, wherein the image processing unit adjusts the pixel values corresponding to the image of the trachea region by increasing a luminance or a brightness of the image of the trachea region.

14. The image processing apparatus of claim 12, wherein the image processing unit adjusts the pixel values corresponding to the image of the trachea region by distinguishing a luminance or a brightness of the image of the trachea region from a luminance or a brightness of the lung region image.

15. The image processing apparatus of claim 12, wherein the image processing unit comprises:
 a trachea compensating unit which extracts the image of the trachea region by using the pixel values in the predetermined region of the image, and adjusts the pixel values corresponding to the image of the trachea region in the image; and
 a lung region extracting unit which extracts the lung region image the image of the trachea region.

16. The image processing apparatus of claim 15, wherein the trachea compensating unit obtains intensities of pixel values in a horizontal direction of a prediction region in which the image of the trachea region is predicted to be disposed, obtains a vertical center line of the trachea by using the intensities of the pixel values, extracts the image of the trachea region based on the vertical center line, and adjusts the pixel values corresponding to the image of the trachea region in the image.

17. The image processing apparatus of claim 15, wherein the trachea compensating unit extracts the image of the trachea region based on a difference between pixel values in the prediction region in which the image of the trachea region is predicted to be positioned in the image.

18. The image processing apparatus of claim 15, wherein the trachea compensating unit extracts the image of the trachea region based on a statistical position model of trachea or a statistical form information of trachea.

19. The image processing apparatus of claim 15, wherein the lung region extracting unit extracts the lung region image based on a geometric active contour model.

20. The image processing apparatus of claim 15, wherein the image processing unit is further configured to output an improved image by smoothing outer boundaries of the lung region_image, and
 wherein the image processing unit further comprises:
 a lung region compensating unit which smoothes the outer boundaries of the lung region image.

21. The image processing apparatus of claim 20, wherein the lung region compensating unit sets one or more outermost points on the outer boundaries of the lung region image as convex hull points, and modifies the outer boundaries of the lung region image as a convex hull curve by using the convex hull points.

22. The image processing apparatus of claim 12, further comprising a radiograph camera which captures the image of the chest by irradiating radiation to the chest.

23. A method of processing an image, the method comprising:
- receiving a radiation chest image;
- setting a predetermined region in the radiation chest image;
- determining an image of the trachea in the predetermined region, the determining comprising determining one boundary of the image of the trachea based on one from among i) a rate of change of pixel values along a linear direction with respect to a first threshold value and ii) a change in the rate of change of pixel values along the linear direction with respect to a second threshold value;
- adjusting pixel values of the image of the trachea to generate an adjusted image of the trachea; and
- determining an image of the lung based on the image of the trachea,
- wherein the determining the image of the lung comprises applying a geometric active contour model.

* * * * *